United States Patent [19]
Corbitt, III

[11] Patent Number: 5,862,843
[45] Date of Patent: Jan. 26, 1999

[54] INFLATOR/DEFLATOR NOZZLE

[76] Inventor: Newsome E. Corbitt, III, 3724 Beauclear Rd., Jacksonville, Fla. 32257

[21] Appl. No.: 694,416

[22] Filed: Aug. 12, 1996

[51] Int. Cl.$^6$ .................................................. F16K 15/18
[52] U.S. Cl. ........................ 141/350; 141/313; 141/386; 137/223; 137/231
[58] Field of Search ................... 141/346, 348–350, 141/313, 383, 386, 38; 137/223, 231–234

[56] References Cited

U.S. PATENT DOCUMENTS

| | | | |
|---|---|---|---|
| 2,759,647 | 8/1956 | Boyer | 141/38 |
| 3,105,527 | 10/1963 | Mayeux | 141/348 |
| 3,242,951 | 3/1966 | Curie et al. | 141/350 |
| 3,486,730 | 12/1969 | Potash | 141/346 |
| 4,114,230 | 9/1978 | MacFarland | 15/330 |
| 4,146,069 | 3/1979 | Angarola et al. | 141/349 X |
| 4,167,204 | 9/1979 | Zeyra | 141/348 |
| 4,239,184 | 12/1980 | Dudar | 141/383 X |
| 4,678,014 | 7/1987 | Owen et al. | |
| 4,823,831 | 4/1989 | Jaw | 137/223 |
| 5,007,448 | 4/1991 | Olinger | 137/223 |
| 5,111,838 | 5/1992 | Langston | 137/223 |
| 5,167,561 | 12/1992 | Rizzo | 446/224 |
| 5,343,889 | 9/1994 | Jaw | 137/232 |

*Primary Examiner*—J. Casimer Jacyna
*Attorney, Agent, or Firm*—Patton Boggs LLP

[57] ABSTRACT

A nozzle is provided for the inflation or deflation of inflatable articles that are equipped with a valve stem having a flap valve, a cap, a hinge connecting the cap to the valve stem, and an annular depression on the external surface of the valve stem. The nozzle comprises an annular conduit equipped with a centrally disposed pin that protrudes partially from the conduit. The conduit is provided with a notch for accommodating the hinge on the valve stem, and a resilient ridge on the interior of the conduit for engaging the annular depression on the external surface of the valve stem, thereby securing the nozzle in place. In use, the nozzle is placed over the valve stem in such a way that the notch is disposed around the hinge. The pin engages the flap valve within the valve stem, thereby allowing the free flow of air through the nozzle.

12 Claims, 4 Drawing Sheets

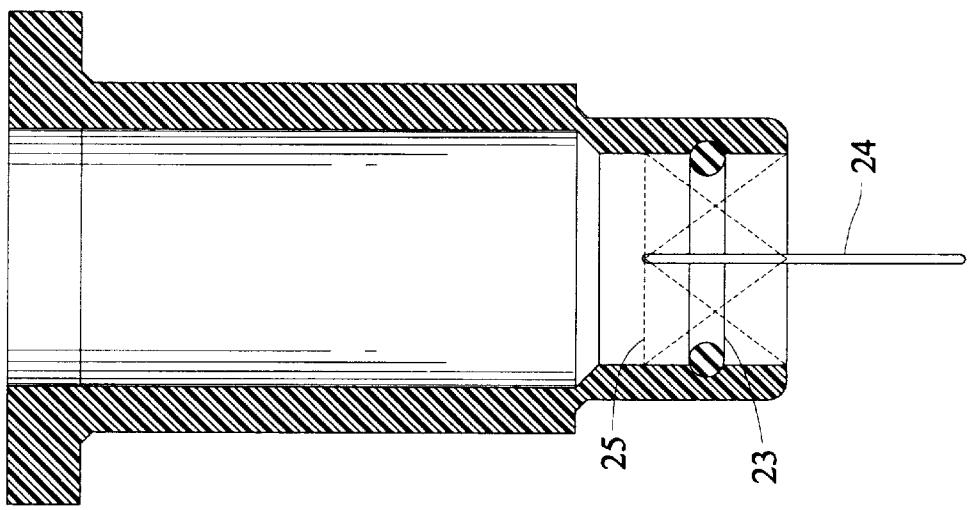
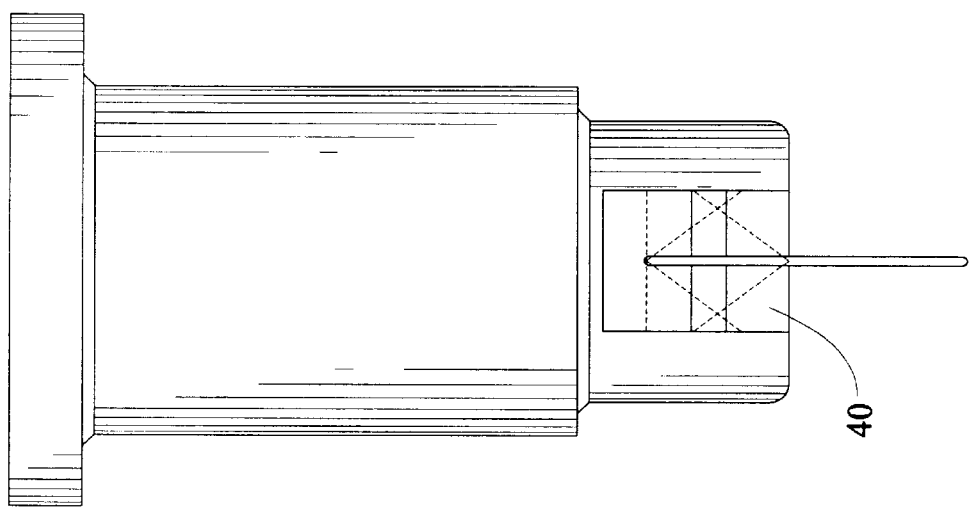

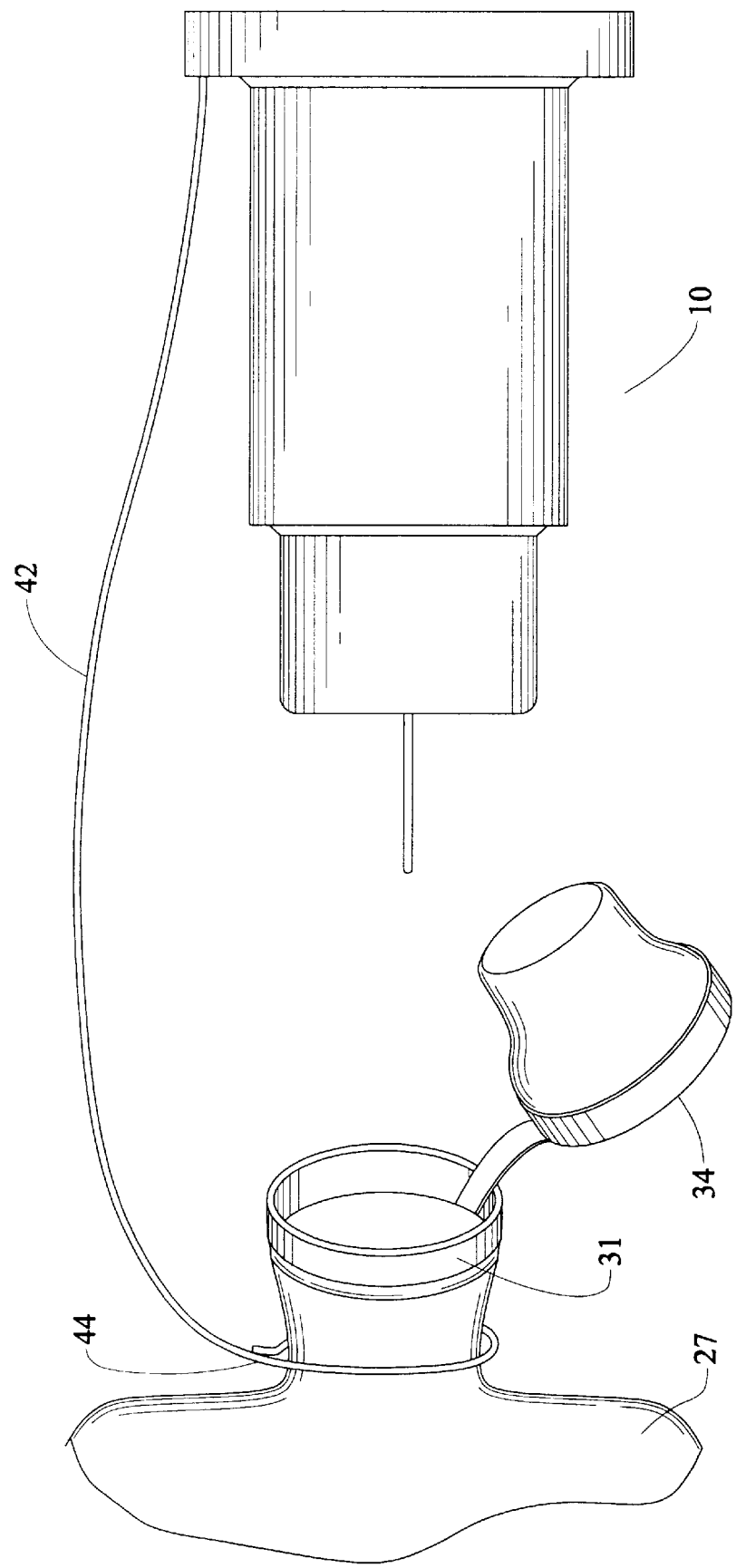

INFLATOR/DEFLATOR NOZZLE

TECHNICAL FIELD

This invention relates generally to the art of inflatable devices, and in particular to a nozzle that may be used to inflate or deflate such devices.

BACKGROUND

Various devices are known to the art for use in inflating and deflating tires, rafts, and similar inflatables.

U.S. Pat. No. 4,678,014 (Owen et al.) discloses a handheld device that can be used to inflate an associated article. The device has a cylindrical body that terminates on one end in a nozzle. The cylindrical body houses a motorized propeller that creates an axial airflow through the nozzle. The nozzle is conical, with a wide base and a narrow tip. The tip is cut away at an angle to the axis of the cone, and is used to maintain the trap door of an air lock valve in an open position.

U.S. Pat. No. 4,114,230 (MacFarland) discloses a device which is similar to that shown in U.S. Pat. No. 4,678,014 (Owen et al.), and which attaches to a vacuum cleaner. The device may be used to inflate and deflate rafts and similar articles.

U.S. Pat. No. 5,167,561 (Rizzo) discloses a device used to simulate weight gain in an inflatable plastic doll. The device is a compressible plastic article which may be designed to look like a hamburger or a soda can, and which is fitted with a nozzle that fits securely into the doll's mouth. When the article is squeezed, air is forced into the doll's mouth, where it expands a series of inflatable pockets located at strategic positions on the doll's body. The nozzle on the device is a hollow plastic cone that is fitted with a rounded bulb.

U.S. Pat. No. 4,167,204 (Zeyra) discloses an apparatus that is used for inflating balloons. The device is equipped with a nose portion that maintains a check valve in the neck of the balloon in an open position, and a push-button that initiates a flow of gas into the device from a pressurized gas source.

While the devices disclosed in the above noted references may be suitable for their intended purposes, none provides a simple, inexpensive means for letting air into or out of an inflatable article equipped with a flap valve. The device of U.S. Pat. No. 4,167,204 (Zeyra), for example, is bulky and complicated, and is limited in use to the inflation of balloons that are fitted with a special check valve. The devices of U.S. Pat. No. 4,678,014 (Owen et al.), U.S. Pat. No. 4,114,230 (MacFarland) and U.S. Pat. No. 5,167,561 (Rizzo) are designed for specialized applications, are not suitable for use in deflating an inflatable article, and cannot be left unattended during use.

It is thus an object of the present invention to provide a simple, easy to use device for inflating or deflating rafts and other inflatable articles.

It is another object of the present invention to provide a device that may be removably attached to the valve stem of an inflatable article to allow the air to flow out of the article, but that resists becoming dislodged during deflation.

It is a further object of the present invention to provide a device for deflating inflatable articles, wherein the device can be left unattended during the deflation process.

It is another object of the present invention to provide an inflation/deflation device which will accommodate a cap hinge attached to the valve stem of an inflatable article.

It is still a further object of the present invention to provide an inflator/deflator device with a pin mounted on its interior for engaging a flap valve in a valve stem, wherein the pin is mounted in such a way that it does not impede the free flow of air through the valve stem.

It is yet another object of the present invention to provide an inflator/deflator device which is equipped with a plurality of interchangeable pins, wherein each of said pins is designed for a particular application or valve stem configuration.

It is another object of the present invention to provide an inflation/deflation device which is equipped with attaching means for attaching the device to a key ring or other convenient holder.

It is still another object of the present invention to provide an inflation/deflation device which is formed from a single molded piece.

It is yet another object of the present invention to provide an inflation/deflation device which is equipped with a connector for attaching the device to the inflatable article even when not in use.

It is still a further object of the present invention to provide an inflation/deflation device equipped with a connector which is capable of releasably attaching to the valve stem of an article wherein the device and connector are integrally formed as a single molded piece.

These and other objects are achieved by the present invention, as hereinafter disclosed.

SUMMARY OF THE INVENTION

The present invention is a nozzle for inflating or deflating inflatable articles that are equipped with a valve stem having a flap valve, a cap, a hinge connecting the cap to the valve stem, and an annular depression on the exterior surface of the valve stem. When the nozzle is properly positioned over the valve stem, it allows the free flow of air therethrough.

The nozzle comprises an annular conduit with a pin centrally disposed therein. The pin protrudes partially from one end of the conduit, and serves to hold the flap valve within the valve stem in an open position. The conduit is provided with a notch for accommodating the hinge on the valve stem. The conduit is further provided with an annular ridge on its interior surface for engaging the annular depression on the exterior surface of the valve stem, thereby removably securing the nozzle to the valve stem. The nozzle may optionally be equipped with an attachment means for releasably connecting the nozzle to the article.

BRIEF DESCRIPTION OF THE DRAWINGS

FIG. 5 is a second elevated side view of the nozzle of the present invention showing the placement of the notch.

FIG. 6 is a perspective view of the nozzle of the present invention connected to a valve stem with which the nozzle of the present invention can be used wherein the nozzle is equipped with a connector positioned around the valve stem.

FIG. 7 is a sectional elevation view of a second embodiment of the nozzle of the present invention.

DETAILED DESCRIPTION OF THE PREFERRED EMBODIMENT

Figure 1:
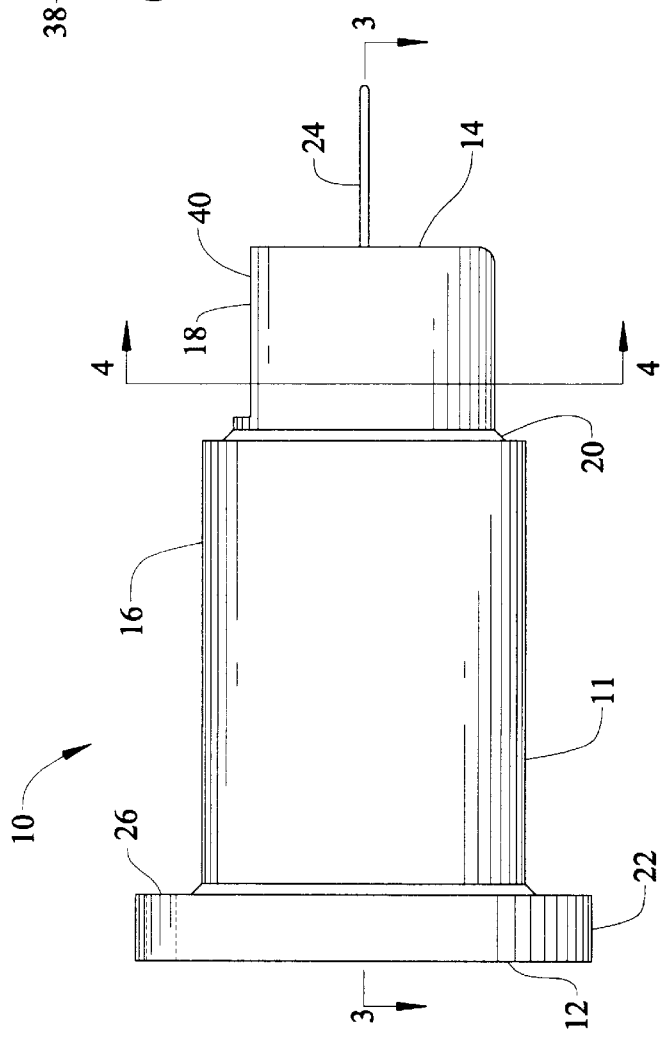
FIG. 1 is an elevated side view of the nozzle of the present invention.

FIG. 1 illustrates the nozzle 10 of the present invention. The nozzle consists of a conduit 11 having first 12 and second 14 openings which are preferably circular or elliptical in shape, and which are in open communication with each other to provide for a free flow of air through the conduit.

The conduit may be of any suitable shape, but is preferably cylindrical. In the preferred embodiment, the conduit is divided into first 16 and second 18 annular segments, wherein the first segment has a larger external diameter than the second segment, and wherein the two segments are joined along a shoulder 20.

Figure 4:
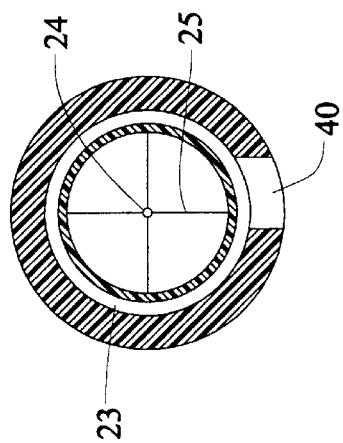
FIG. 4 is a cross-section taken along Line 4—4 of FIG. 1.

The conduit is provided in the vicinity of the first opening with an annular lip 22 or flange. The conduit is also provided with a pin 24 that protrudes partially from the second opening. Preferably, the pin is centrally disposed along the interior of the conduit as shown in FIG. 4, although other orientations may be suitable for particular applications. The interior surface of the conduit is equipped, in the vicinity of the pin, with an annular ridge 23 (see FIGS. 3–5).

Figure 3:
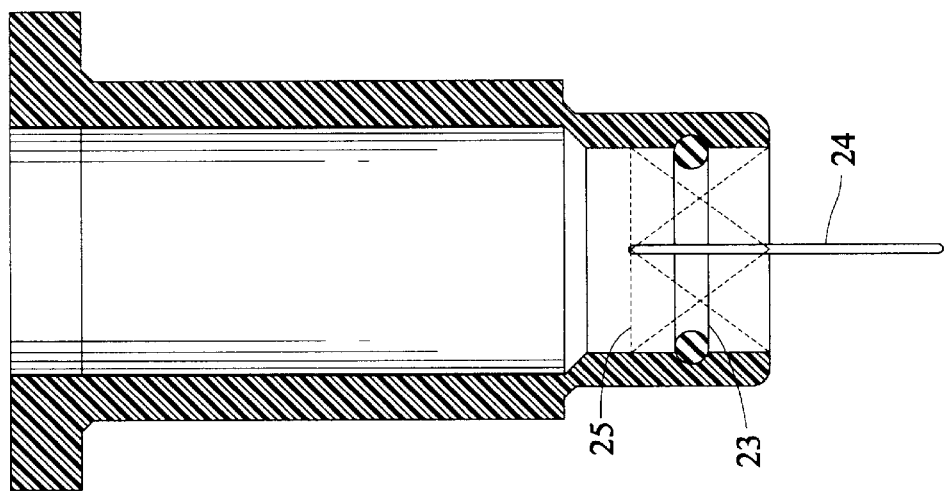
FIG. 3 is a view in section taken along Line 3—3 of FIG. 1.

Referring to FIGS. 3 and 4, the pin 24 is secured within the interior of the conduit by a suitable support means 25 which supports the pin in an essentially fixed orientation. The support means preferably consists of a web of material that maintains the pin in a proper orientation but that does not significantly impede the flow of air through the conduit. A suitable web may comprise one or more strips of plastic. In the preferred embodiment, the support means consists of at least two strips of plastic that intersect along the central axis of the conduit, and the pin is mounted at the point of intersection.

The pin may be secured to the support means in various ways, such as through the use of a suitable adhesive, by molding the support means around the pin, by integrally forming the pin and nozzle from a single molded piece, by providing the support means with an aperture that engagingly receives the pin, and by other suitable means as are known to the art. The pin may also be removably mounted on the support means, thus allowing the pin to be removed for storage or interchanged with other pins that are specifically designed for particular applications.

Referring to FIG. 1, the nozzle may be equipped with one or more apertures 26 for receiving a chain, key ring, snap, or similar device used for holding or storing the nozzle or attaching the nozzle to a substrate. Preferably, the aperture is in the form of a rounded hole provided in the lip. The aperture may be equipped with a metal or plastic insert, sleeve, or similar device that adds strength and mechanical integrity to the aperture and the material surrounding it, and improves the resistance of that material to mechanical fatigue.

Figure 2:
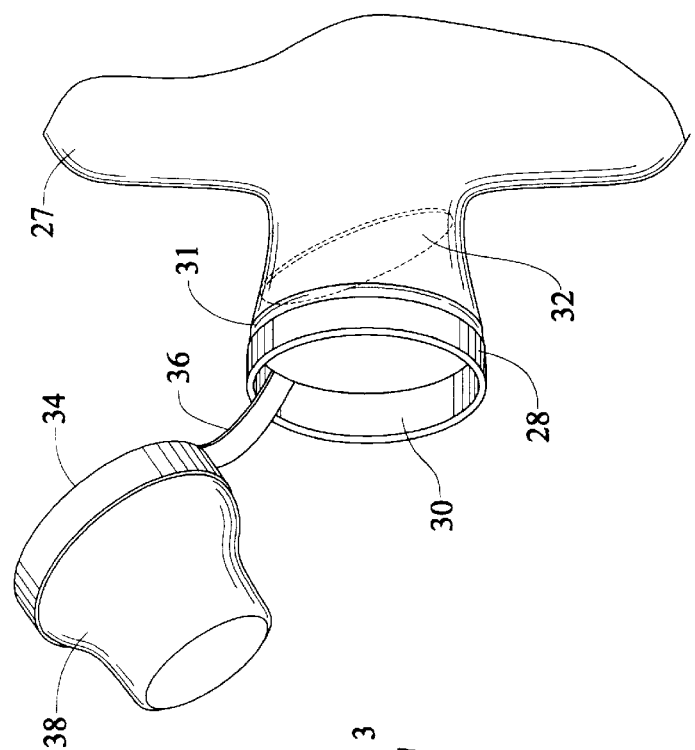
FIG. 2 is a perspective view of a valve system with which the nozzle of the present invention can be used.

FIG. 2 shows a conventional valve stem that the present invention can be used with. Valve stems of this type are commonly used with low pressure inflatable articles such as rafts. The valve stem consists of a flexible base 27 which terminates in a tapered stem 28. The stem is provided with a rounded opening 30, and is equipped with an annular indentation 31 on its exterior surface. A flap valve 32 is pivotally connected to the interior surface of the valve stem to induce a one-way flow of air into the article. A cap 34 is attached to the valve stem by means of a flexible rectangular tab or hinge 36. The cap is provided with a conical stopper 38 which releasably seals the rounded opening.

The nozzle may be optional equipped with a tab, connector 42 or other suitable means for attaching, connecting and/or securing the nozzle to the article. Typically, the optional connector will be formed from the same material as the nozzle and may even be integrally formed with the nozzle from a single molded piece. The connector is preferably equipped with an opening 44 capable of releasably attaching to the valve stem. Most preferably the opening in the connector is adapted to fit over the valve stem to secure the nozzle to the article.

Referring to FIGS. 1, 4 and 5, the interior surface of the conduit may be provided in the vicinity of the second opening with a notch 40 that is of sufficient dimensions to accommodate the hinge on the valve stem of the inflatable article. Preferably, the notch is rectangular and extends longitudinally from the edge of the second opening along the axis of the nozzle. The notch prevents the hinge from being compressed, thereby promoting a relatively tight seal between the nozzle and the valve stem and avoiding stress on the hinge.

FIG. 7 shows a second embodiment of the nozzle of the present invention which is identical to the nozzle shown in FIGS. 1–6 except that the inner diameter of first segment 16 of nozzle 10 is larger than the internal diameter of second segment 18.

While the conduit is preferably approximately cylindrical in shape, other shapes may be used, as dictated by the application to which the nozzle is directed. However, it is preferred that the shape of the interior surface of the conduit in the vicinity of the pin is complimentary in shape to the exterior surface of the valve stem in order to promote a relatively tight seal between the two.

The nozzle may be made out of any suitable materials as are known to the art, but is preferably constructed out of a transparent or translucent semi-rigid plastic, such as medium density polyethylene. The nozzle may be assembled from separate components which are affixed together through the use of a suitable adhesive or by other means as are known to the art. The nozzle may also be cast or molded as an integral unit.

The annular ridge disposed on the interior surface of the conduit may be formed from any suitable material including rubber or elastomer which is sufficiently resilient to allow it to be lightly deformed as the nozzle is coaxed over the valve stem, but which is sufficiently rigid to hold the nozzle in place once the ridge has engaged the annular depression on the surface of the valve stem. Typically, the annular ridge will be made of the same material as the conduit. Preferably, the annular ridge will be formed from the same material as the conduit.

The pin may be made out of any suitable material which is sufficiently rigid and durable for its intended use including the same material as the nozzle. Such materials include suitable metals, such as stainless steel, and suitable plastics, such as high density polyethylene.

It should be appreciated that the nozzle including the pin, support means, conduit, annular ridge, notch, and connector may be formed in two or more parts or as a single molded piece.

The dimensions of the nozzle may vary in accordance with the particular application to which the nozzle is directed. However, in the typical embodiment suitable for use with a rubber raft, the length of the nozzle will be about 2", the interior diameter of the conduit will be about 0.6", the external diameter across the lip will be about 1.4", and the pin will be about 0.5" in length.

EXAMPLE 1

This example illustrates the use of the device of the present invention in deflating a rubber raft equipped with the type of conventional valve stem described above.

The cap is disengaged from the valve stem, and the nozzle of the present invention is aligned with the valve stem in such a way that the rectangular notch is in alignment with the cap hinge. The nozzle is then coaxed over the external surface of the valve stem so that the cap hinge is engaged in the notch and the annular ridge disposed on the interior surface of the nozzle is snugly engaged in the annular depression on the external surface of the valve stem.

Once the nozzle is secured in place, the pin engages the flap valve, allowing a positive flow of air out of the valve stem and through the interior of the conduit. The annular ridge on the nozzle prevents the nozzle from being displaced by the pressure of the air flowing out of the valve stem, and allows the nozzle, once it is properly positioned on the valve stem, to be left unattended until the raft has been fully deflated. Once the raft is deflated, the nozzle is coaxed off of the valve stem.

EXAMPLE 2

This example illustrates the use of the device of the present invention in inflating a rubber raft equipped with a conventional valve stem as described above.

A tank of compressed air or another suitable source of pressurized gas is provided. The tank is equipped with a regulator and a hose. The free end of the hose is inserted into the first segment of the nozzle, and is provided with a clamp which engages the annular lip on the nozzle, thereby securing the hose in place. The external diameter of the hose is such that the hose fits snugly within the first segment of the nozzle, but is too large to pass into the second segment.

The nozzle is attached to the valve stem of the raft as in Example 1. The regulator on the tank is then activated so that a positive pressure of air is applied across the valve stem, and the raft begins to inflate. When the article is suitably inflated, the nozzle is pulled off of the valve stem, with no significant loss of air pressure within the raft.

The above description is merely illustrative of the present invention, and is not intended to be limiting. Therefore, the scope of the invention should be construed solely by reference to the appended claims.

What is claimed is:

1. A nozzle, for use in inflating or deflating an article equipped with a valve stem having an annular depression on its external surface and a flap valve pivotally connected to its internal surface, the nozzle comprising:
   a conduit equipped with first and second openings, said first and second openings being in open communication with each other, said conduit including a notch in the vicinity of said second opening for accommodating a hinge on a valve stem;
   first engagement means, extending from said second opening, for engaging a flap valve; and,
   second engagement means, disposed on the interior surface of said conduit, for engaging an annular depression on a valve stem.

2. In combination with a valve stem equipped with a flap valve, a cap, and a hinge attaching said cap to said valve stem, a nozzle for maintaining said flap valve in an open position, the nozzle comprising:
   a conduit equipped with first and second openings, said first and second openings being in open communication with each other;
   a protrusion extending from said second opening for engaging said flap valve; and
   a notch, disposed in the vicinity of said second opening, for accommodating said hinge.

3. The combination of claim 2, further comprising support means for supporting said protrusion in an essentially fixed orientation.

4. The combination of claim 3, wherein said support means comprises at least two strips which intersect at a point on the interior of said conduit, and wherein said protrusion is supported at said point of intersection.

5. The combination of claim 4, wherein said strips are plastic, and wherein said point of intersection is disposed along the longitudinal axis of said conduit.

6. The combination of claim 2, wherein said protrusion is a pin.

7. The combination of claim 2, wherein said conduit comprises first and second annular segments, and wherein the internal diameter of said first annular segment is larger than the internal diameter of said second annular segment.

8. The nozzle of claim 7, wherein the interior surface of said second annular segment is complimentary in shape to the external surface of the valve stem.

9. For use with a valve stem having a hollow conical body terminating in a circular opening, a circular flap valve pivotally disposed within the interior of said conical body, an annular depression disposed on the external surface of said conical body, and a cap attached to said conical body by means of a flexible rectangular hinge, a nozzle for holding said flap valve in an open position and for permitting the free flow of air past said flap valve, said nozzle comprising:
   a first annular conduit terminating on one end in an annular flange, and terminating on the other end in a second annular conduit, said second annular conduit being open on one end and having a smaller internal and external diameter than said first annular conduit;
   a pin, centrally disposed within said second annular conduit and protruding from the end thereof;
   a resilient annular ridge, disposed on the interior surface of said second annular conduit in the vicinity of said pin, for engaging the annular depression on the exterior surface of the valve stem;
   support means, disposed within said second annular conduit, for supporting said pin in an essentially fixed orientation, said support means comprising a web of material that does not significantly impede the flow of air though said second annular conduit; and
   a rectangular notch, disposed along the open end of said second annular conduit, for accommodating the hinge attached to the valve stem;
   wherein the interior of said second annular conduit is complimentary in shape to the exterior surface of the valve stem.

10. The nozzle of claim 9, further comprising:
    an aperture, disposed in said lip, for receiving a key chain, said aperture being internally fitted with a metal or plastic sleeve.

11. The nozzle of claim 9, further comprising:
    a connector tab, for releasably attaching said nozzle to said valve stem.

12. The nozzle of claim 11 wherein said nozzle is formed as a single molded piece.

* * * * *